Oct. 8, 1963
L. C. ANGERMEYER
3,106,690
ELECTRICAL INDUCTION APPARATUS
Filed Dec. 10, 1958
2 Sheets-Sheet 1
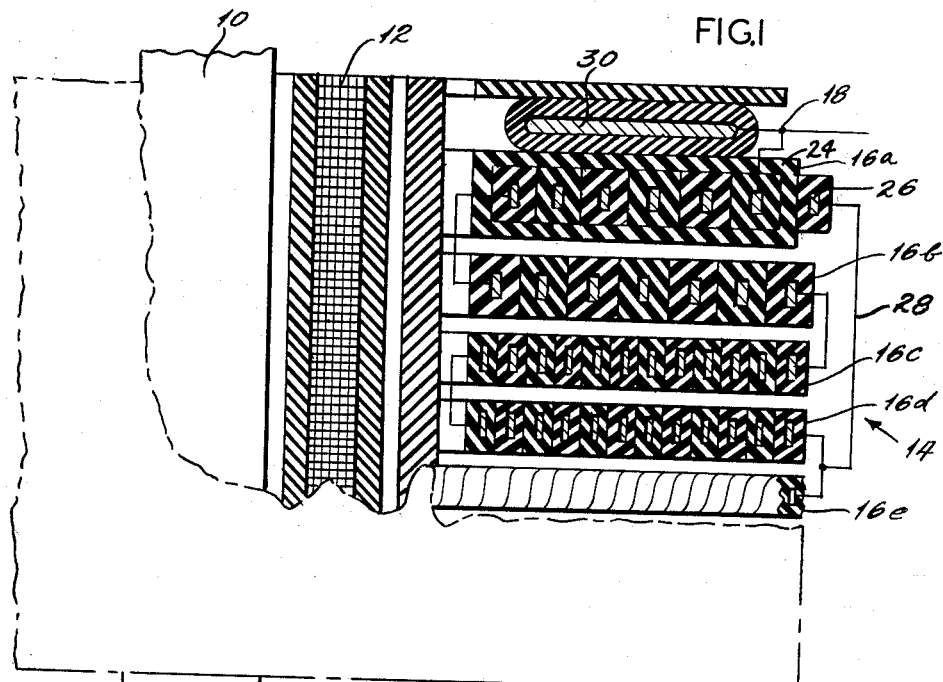
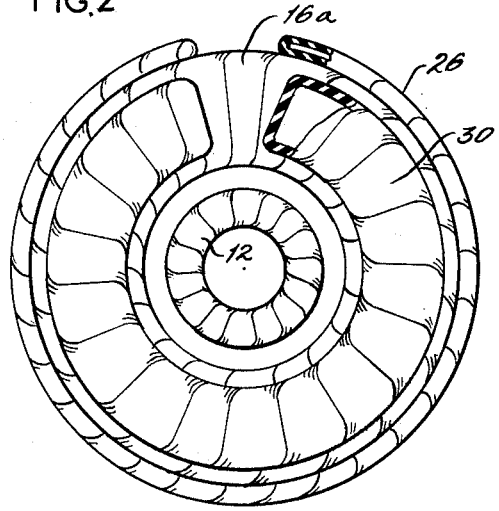
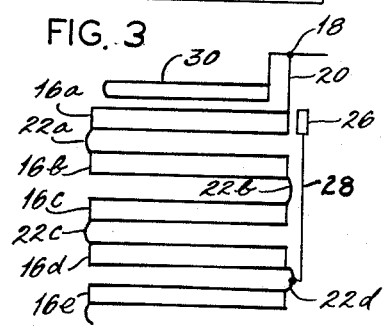
INVENTOR
LOUIS C. ANGERMEYER
By Gravely, Lieder & Woodruff
ATTORNEYS.

Oct. 8, 1963 L. C. ANGERMEYER 3,106,690
ELECTRICAL INDUCTION APPARATUS
Filed Dec. 10, 1958 2 Sheets-Sheet 2
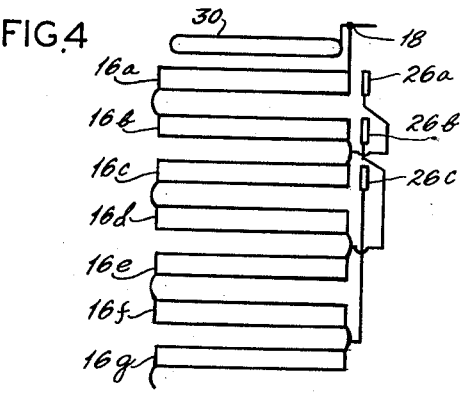
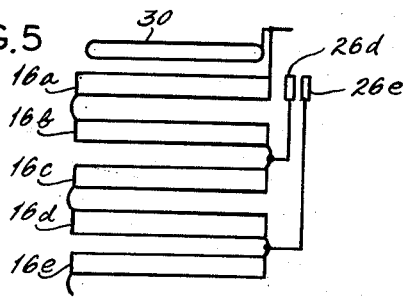
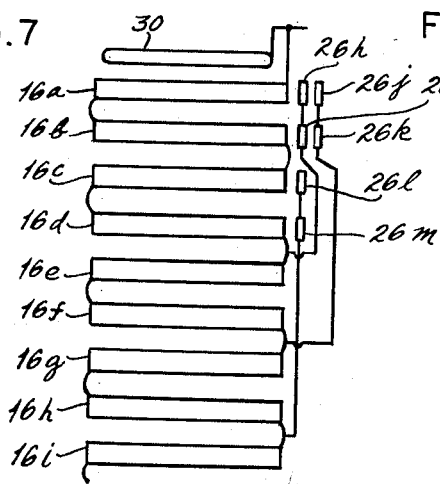
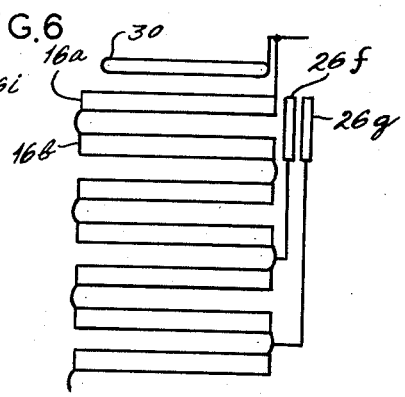
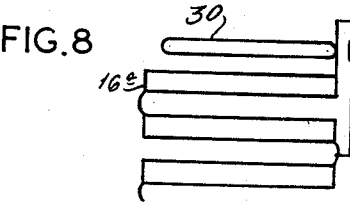
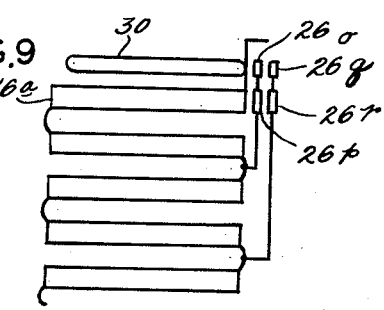
INVENTOR:
LOUIS C. ANGERMEYER
BY Gravely, Lieder & Woodruff
ATTORNEYS.

United States Patent Office 3,106,690
Patented Oct. 8, 1963

3,106,690
ELECTRICAL INDUCTION APPARATUS
Louis C. Angermeyer, St. Louis, Mo., assignor to Wagner Electric Corporation, St. Louis, Mo., a corporation of Delaware
Filed Dec. 10, 1958, Ser. No. 779,312
1 Claim. (Cl. 336—70)

This invention relates to electrical induction apparatus in general and more particularly to electrostatic shielding structures for the windings of such an apparatus.

The windings of electrical induction apparatus, such as transformers, are often connected to transmission lines on which high voltage surges may occur due to switching operations, lightning, arcing and other conditions. Because of the inherent capacitance which is present between the windings of the transformer, a surge voltage on entering the winding will not distribute itself uniformly over the winding, but instead will be more highly concentrated in certain windings, the greatest stress usually occurring between parts of the winding near the line end thereof.

Various electrostatic shielding arrangements have been devised in the past for neutralizing the effect of the unevenness of the distribution of inherent capacitances between turns in order to obtain a more even initial distribution of the high voltage surges and thereby prevent damage to certain windings of the transformer. Electrostatic shields have the effect of reducing the high concentration of voltage stress between certain turns or coils of the winding upon the occurrence of a high voltage surge and of producing a more uniform distribution of said voltage across the whole winding. Ideally, a uniform initial distribution of a high voltage surge is desirable, however, this is generally not practical or necessary. The addition of simple capacitive or electrostatic elements adjacent the line end of high voltage windings usually provides suitable protection against high voltage surges. If the voltage stress between parts of the winding near the line end are reduced, the voltage stresses between other portions of the winding are also reduced even though those portions are not provided with electrostatic elements.

Various electrostatic shielding arrangements have been used in the past in which the elements or shields are conductively connected to a relatively high potential point of the winding and electrostatically coupled to a coil or turn which is at a lower potential point. For example, an electrostatic shield is often conductively connected to the line terminal, and electrostatically coupled to an intermediate coil which is at a relatively lower potential. In this type of arrangement a considerable amount of additional insulation is usually employed between the electrostatic element, which is at line potential, and the coil to which it is electrostatically coupled since less insulation is employed for the coils at the lower potentials more remote from the line end. For example, it is common practice to insulate the first, or the first few coils (often referred to as "buffer" coils) nearest to the line terminal more heavily than succeeding coils which are further from the line in order to provide additional protection against the concentration of high voltages between these coils. In such cases, the amount of insulation is usually decreased progressively for successive coils more remote from the line.

In accordance with the present invention, an electrostatic shielding structure is provided in which a more efficient utilization of insulation is realized, resulting in a reduction in the total amount of insulation required, and also resulting in a reduction in the overall diameter of the winding and size of other parts. This is accomplished with the present invention by electrostatically coupling an electrostatic element to a high potential point of the winding structure and conductively connecting it to a coil at a lower potential point.

It is therefore an object of the present invention to provide an improved electrostatic shielding device which greatly reduces the chances of damage to windings subjected to high surge voltages.

Another object is to improve the distribution pattern of surge voltages occurring across a plurality of winding coils.

Another object is to prevent damage to transformers and similar devices which are subject to high voltage surges.

Another object is to provide a relatively simple and economical electrostatic shielding device for a winding, such as a transformer winding.

Another object is to more efficiently utilize insulation on electric windings.

Further objects and advantages of the invention will become apparent after considering the following detailed description, reference being had to the accompanying drawings wherein preferred embodiments of the present invention are shown.

In the drawings:

FIG. 1 is a fragmentary cross-sectional view of a transformer constructed in accordance with the present invention;

FIG. 2 is a plan view of the windings of the transformer of FIG. 1;

FIG. 3 is a diagrammatic view of the shielding structure and high voltage winding of the transformer of FIG. 1; and FIGS. 4 to 9, inclusive, are diagrammatic views similar to FIG. 3 showing various other forms of the electrostatic shielding structure.

Referring to the drawings more particularly by reference numbers, the number 10 refers to one leg of a transformer core, the other portions of which are not shown because they are not essential to a full and complete understanding of the invention. A low voltage winding 12 and a high voltage winding 14 are mounted on the core leg 10. The electrostatic shielding device is shown in connection with the high voltage winding and will be more fully described hereinafter.

As previously mentioned, the coils nearer the line end of the winding of high voltage transformers are normally more heavily insulated than intermediate coils spaced from the line end in order to provide additional protection against the higher voltage stresses occurring between parts at the line end due to surge voltages. Thus, the coil 16a, being the line-end coil, is more heavily insulated than succeeding coils spaced farther away from the line end of the winding. The coil 16a may be provided with an additional layer 24 of insulating paper wrapped around the entire coil. The next adjacent coil, coil 16b, is shown with less insulation than coil 16a, but is more heavily insulated than the succeeding coils 16c and 16d, and so on.

The high voltage winding 14 includes a plurality of axially spaced superposed disc type coils concentric with the low voltage winding 12. Four of the coils, 16a, 16b, 16c, and 16d, are shown in cross section (FIG. 1). The coils of winding 14, as indicated in FIGS. 1 and 3, are connected in series; the outer turn of coil 16a being connected to a high voltage terminal 18 by a lead 20, the inner turn of coil 16a being connected to the inner turn of coil 16b by a lead 22a, the outer turn of coil 16b being connected to the outer turn of coils 16c by a lead 22b, the inner turn of coil 16c being connected to the inner turn of coil 16d by a lead 22c, the outer turn of coil 16d being connected to the outer turn of coil 16e by the lead 22d, and so on.

The electrostatic shielding structure of the present invention, as illustrated in FIGS. 1, 2 and 3, includes an insulated electrostatic shield or element 26 in the form of an annular conductor or metallic strip positioned adjacent to the outer surface of the line-end coil 16a so that it is electrostatically coupled therewith. As shown in FIG. 2, the element 26 extends around the coil 16a for less than 360°, and therefore does not form an effective short-circuit turn. The element 26 is also conductively connected by a lead 28 to coil 16d which is axially spaced on the core from the line-end coil 16a. A convenient connection is made to the lead 22d which connects adjacent coils 16d and 16e together. The shielding structure may include an insulated electrostatic plate 30 of conventional form which is positioned at the line end of the winding. As shown, the plate 30 consists of a relatively wide annular conductor positioned adjacent to the upper side of coil 16a so that it is electrostatically coupled thereto. The plate 30 is conductively connected to the line terminal 18. The plate 30, of course, also does not close around the core. Both the element 26 and plate 30 may be insulated with conventional insulating paper as indicated in FIG. 2.

FIG. 3 schematically illustrates the high voltage winding and associated shielding structure of FIG. 1. It is shown therein that the element 26, which is adjacent the line-end coil 16a and conductively connected to coil 16d, provides additional capacitance at the line end of the winding, and results in reduced voltage stresses between parts of the winding near the line end upon the occurrence of a surge voltage. Voltage stresses between other portions of the winding, of course, are reduced even though the portions are not provided with shields.

The element 26 is positioned adjacent to and spaced radially outwardly from the line-end coil 16a. It is conductively connected to the coil 16d which is axially spaced from and at a lower potential point of the winding than is the coil 16a. Thus, under normal operating conditions, the element 26 is electrostatically coupled to a surface of the winding structure which is at a relatively high potential and is conductively connected to a portion of the winding at a relatively low potential.

With the element 26 electrostatically coupled to the more heavily insulated line-end coil 16a, and conductively connected to the less heavily insulated coil 16d, a lesser total amount of insulation is used, since no additional insulation is required about the coil 16d. The insulation normally used about the more heavily insulated line-end coil 16a permits the use of less additional insulation between the coil 16a and the element or coil to which the element is conductively connected. In other words, since the electrostatic element is conductively insulated from the line-end of the winding no additional insulation is required at the normally less insulated coil 16d.

The phrase "conductively connected" as used in this specification indicates a direct conductive connection between parts or a substantially non-inductive connection.

FIGS. 4 to 9, inclusive, show various forms of the elestrostatic shielding structure of the present invention.

In FIG. 4 electrostatic elements 26a, 26b, and 26c are electrostatically coupled to successive coils 16a, 16b, and 16c, respectively. Each element is conductively connected to a coil which is normally at a lower potential than the coil to which it is electrostatically coupled. Element 26a is connected to the lead connecting coil 16b and 16c together, element 26b is connected to the lead connecting coils 16d and 16e together, and element 26c is connected to the lead which connects coils 16f and 16g. Each element is conductively connected to a point of the winding which is at a lower potential (under normal operation) than the surfaces to which they are electrostatically coupled. Upon the occurrence of a surge voltage, charging currents flow from the elements through the coils to which they are connected and thereby increase the voltages of the coils which are at the lesser potentials so that the voltages between parts of the winding near the line end are reduced. Since the elements are coupled to progressively lower potential points on the winding, the potentials produced on the successive coils to which they are conductively connected are increased to obtain a more uniform voltage distribution.

FIG. 5 indicates a construction in which two electrostatic elements 26d and 26e are spaced radially outwardly of the line end coil 16a. The element 26e is positioned adjacent to the outer surface of element 26d. The element 26d is conductively connected to a lead which connects coils 16b and 16c, while element 26e is conductively connected to a lead which connects the coils 16d and 16e together. If a surge voltage occurs, charging currents will flow from these elements to their respective connections with the coils and thereby increase the voltages on the associated low potential coils and thereby reduce voltage stresses between portions of the winding.

FIG. 6 shows a construction similar to that shown in FIG. 5, except in FIG. 6 the elements 26f and 26g are made wide enough to overlap two adjacent coils instead of one. By this arrangement greater additional capacitance is obtained than by the construction shown in FIG. 5. With this construction, not only is there capacitive coupling between the line-end coil and the coil to which the element 26f is conductively connected, but also there is capacitive coupling between the outer turns of the first two coils 16a and 16b. Element 26g, of course, being electrostatically coupled to the element 26f, provides additional capacitance between the line end of the winding and the coil to which it is conductively connected.

In FIG. 7, the electrostatic shielding structure includes a plurality of elements particularly well adapted for use with high voltage windings where a considerable amount of additional capacitance is required. Electrostatic elements 26h and 26i are shown positioned adjacent to coils 16a and 16b, respectively, and conductively connected together and to a lead which connects coils 16d and 16e together. Elements 26j and 26k are positioned adjacent to elements 26h and 26i, respectively, and conductively connected down the winding stack to the lead which connects coils 16f and 16g. Elements 26l and 26m are positioned adjacent to coils 16c and 16d, respectively, and conductively connected together and to the lead which connects coils 16h and 16i. By connecting two adjacent elements in series there is provided capacitive coupling between the adjacent coils as well as between the adjacent coils and the coils to which the elements are conductively connected.

FIGS. 8 and 9 show simple arrangements wherein capacitive or electrostatic coupling between the electrostatic plate 30 and a coil down the winding stack is provided. In FIG. 8, the element 26n is spaced radially outwardly of the plate 30 and capacitively coupled thereto. It is conductively connected to a coil down the winding stack which is at a normally lower potential point of the winding than is the plate 30. In FIG. 9, the structure shown employs elements 26o and 26p conductively connected together and positioned adjacent to the plate 30, and to the coil 16a, respectively, and elements 26q and 26r which are conductively connected together and positioned adjacent to the elements 26o and 26p, respectively. It will be apparent that the use of elements adjacent the plate 30 has the effect of increasing the effective size of the elements and hence the capacitance thereof.

It will be noted from the drawings that each electrostatic shield or element is spaced radially outwardly from a part or surface of the winding structure which is axially closer to the line end of the winding than that part of the winding to which the element is conductively connected. Thus, each element is electrostatically coupled to a part of the winding structure which is, under normal operating conditions, at a higher potential, than that part of the winding to which the element is conductively connected.

In accordance with the present invention the insulation normally provided about the coils near the line end of the winding is more economically utilized so that less additional insulation about the electrostatic shields is required. No additional insulation about the coils conductively connected to the electrostatic shields is required.

While various specific forms of the electrostatic shielding structure of the present invention have been shown and described, other changes, alterations and modifications will be apparent to those skilled in the art. All such changes, alterations and modifications which do not depart from the spirit and scope of the invention are deemed to be covered by the invention which is limited only by the claim which follows.

What is claimed is:

In an electrical induction apparatus having a magnetic core, a high voltage line terminal, a disc type winding surrounding the core and including a high potential coil and a plurality of axially disposed coils of relatively lower potential, lead means connected between adjacent coils to connect said coils in series, a lead connecting said high potential coil with said high voltage line terminal, each of said high and lower potential coils having a plurality of coil turns with only insulation therebetween and said high potential coil being more heavily insulated than said lower potential coils, the combination therewith comprising an electrostatic shielding structure having a coupling circuit for directly electrostatically coupling said high potential coil to one pair of adjacent lower potential coils including a metal strip having insulation thereon and extending along the radially outermost turn of said high potential coil with only insulation therebetween, said strip being axially spaced from said one pair of lower potential coils, and non-inductive connection means connected between said strip and only the lead means connected between said one pair of lower potential coils wherein said high potential coil is directly electrostatically coupled to said one pair of lower potential coils and the insulation between the radially outermost turn of said high potential coil and said strip is disposed in said coupling circuit between said high potential coil and said one pair of lower potential coils, the insulation of said radially outermost turn of said high potential coil being utilized in combination with that of said strip to minimize the amount of insulation necessary on said strip to effectively insulate said one pair of lower potential coils from said high potential coil.

References Cited in the file of this patent

UNITED STATES PATENTS

| | | |
|---|---|---|
| 1,034,929 | Reynders | Aug. 6, 1912 |
| 2,279,027 | Weed | Apr. 7, 1942 |
| 2,905,911 | Kurita | Sept. 22, 1959 |